May 12, 1959  D. M. SCHWARTZ  2,886,192
MATERIAL HANDLING MACHINE
Filed April 9, 1956  4 Sheets-Sheet 1
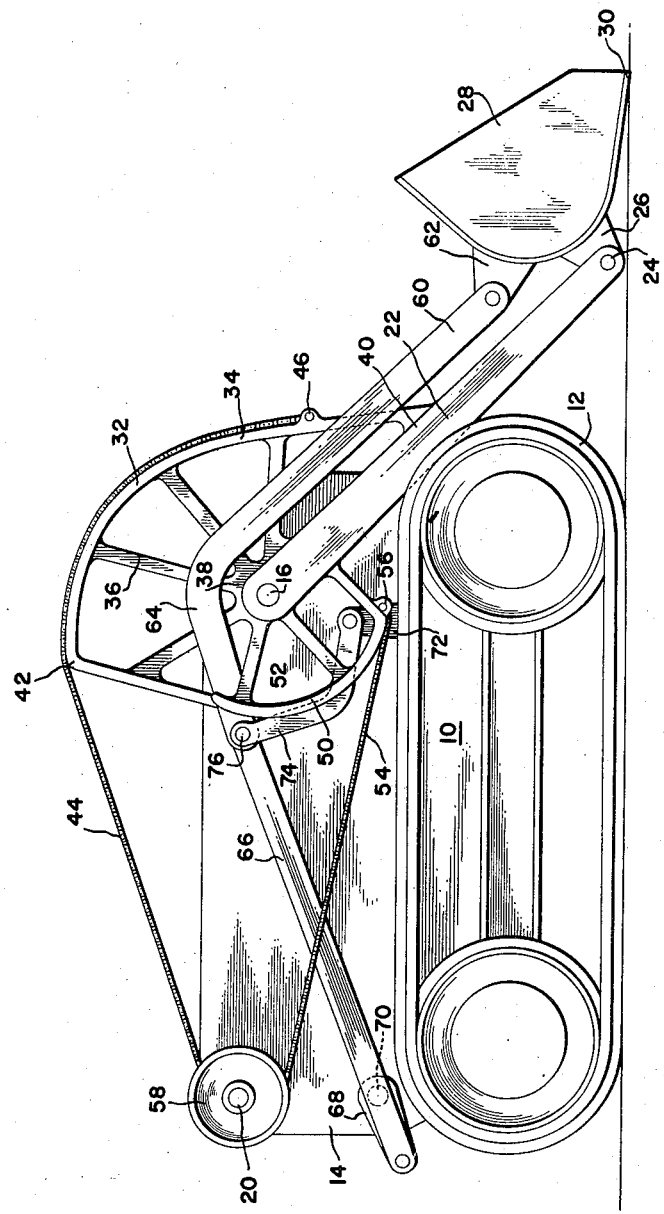
INVENTOR
DANIEL M. SCHWARTZ
BY Harold T. Stowell
ATTORNEY May 12, 1959 D. M. SCHWARTZ 2,886,192
MATERIAL HANDLING MACHINE
Filed April 9, 1956 4 Sheets-Sheet 2
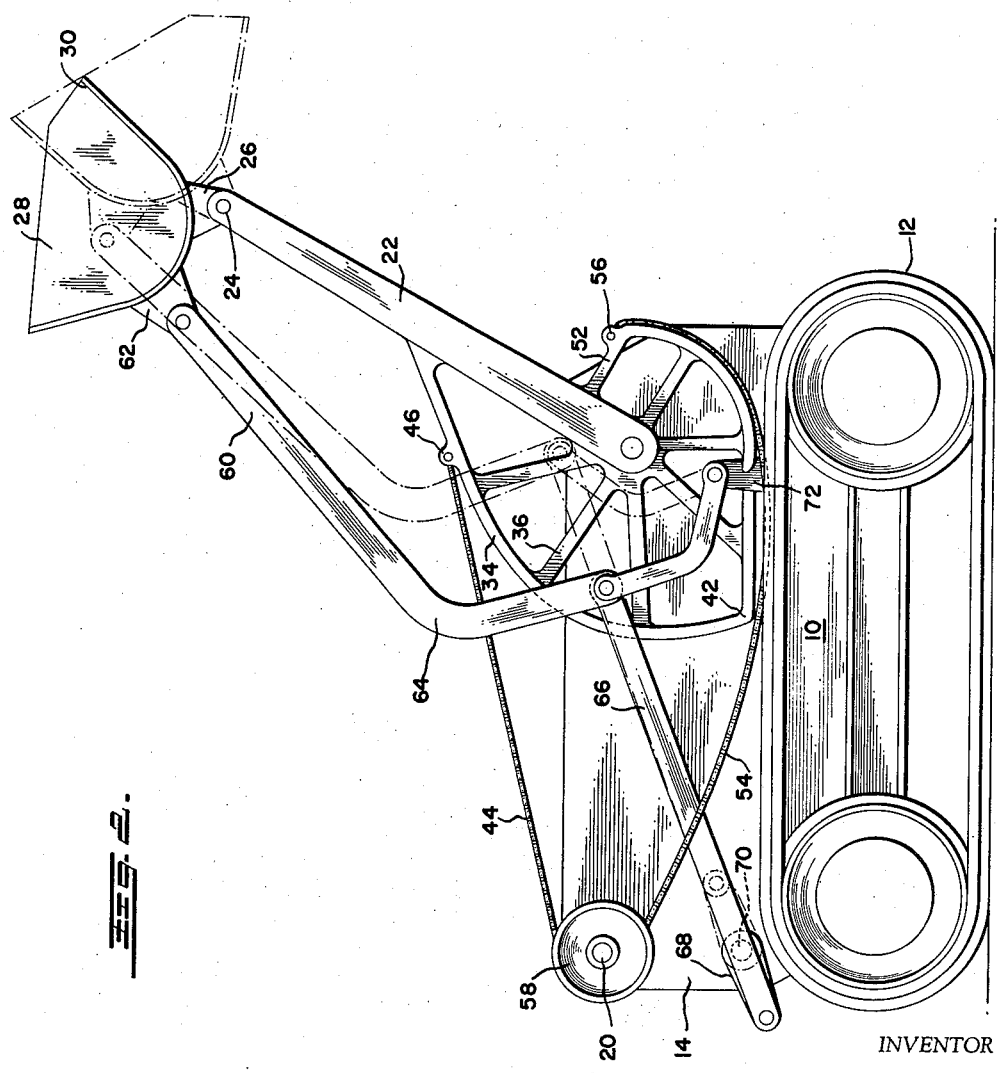
INVENTOR
DANIEL M. SCHWARTZ
BY Harold T. Stowell
ATTORNEY May 12, 1959 — D. M. SCHWARTZ — 2,886,192
MATERIAL HANDLING MACHINE
Filed April 9, 1956 — 4 Sheets-Sheet 3
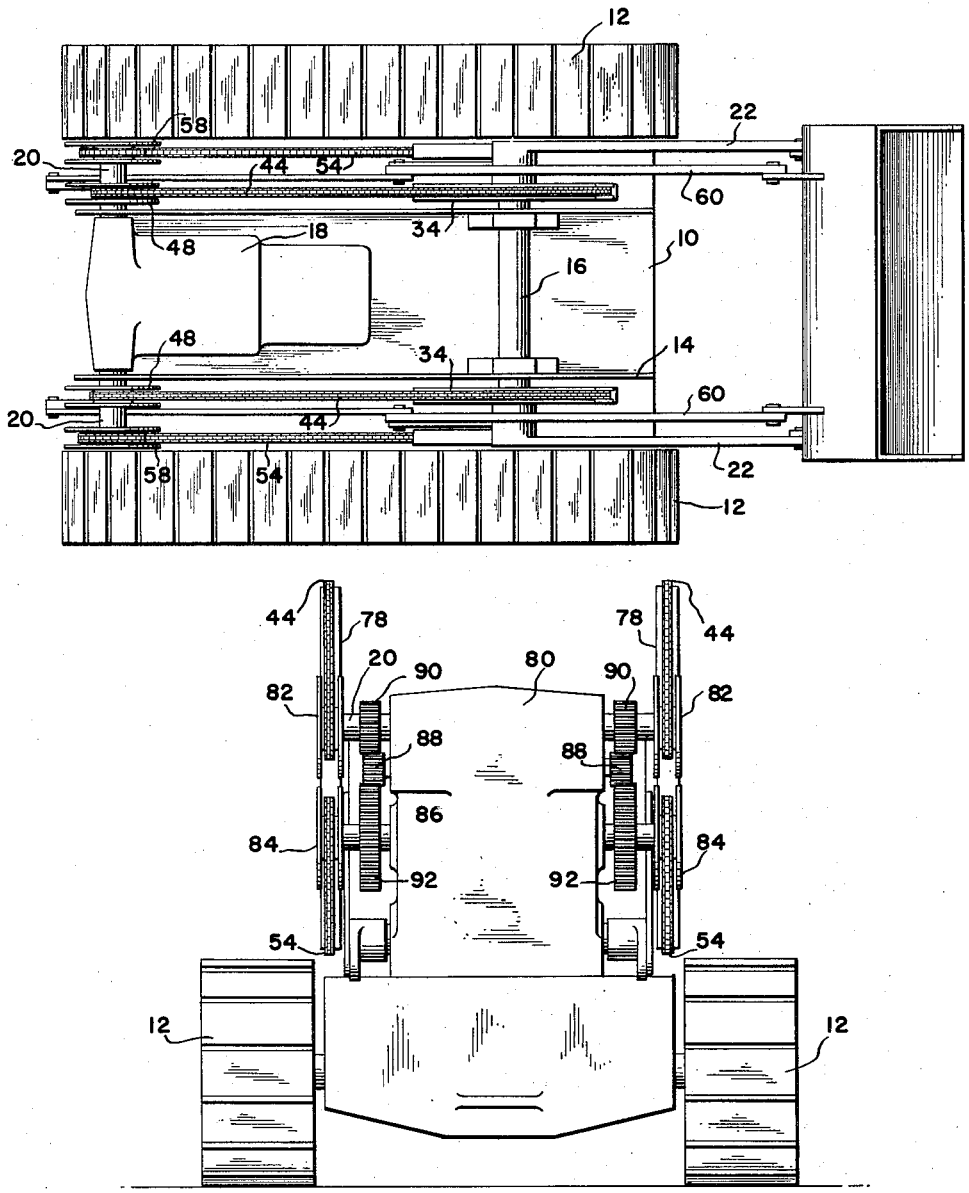
INVENTOR
DANIEL M. SCHWARTZ
BY Harold T. Stowell
ATTORNEY May 12, 1959     D. M. SCHWARTZ     2,886,192
MATERIAL HANDLING MACHINE
Filed April 9, 1956                         4 Sheets-Sheet 4
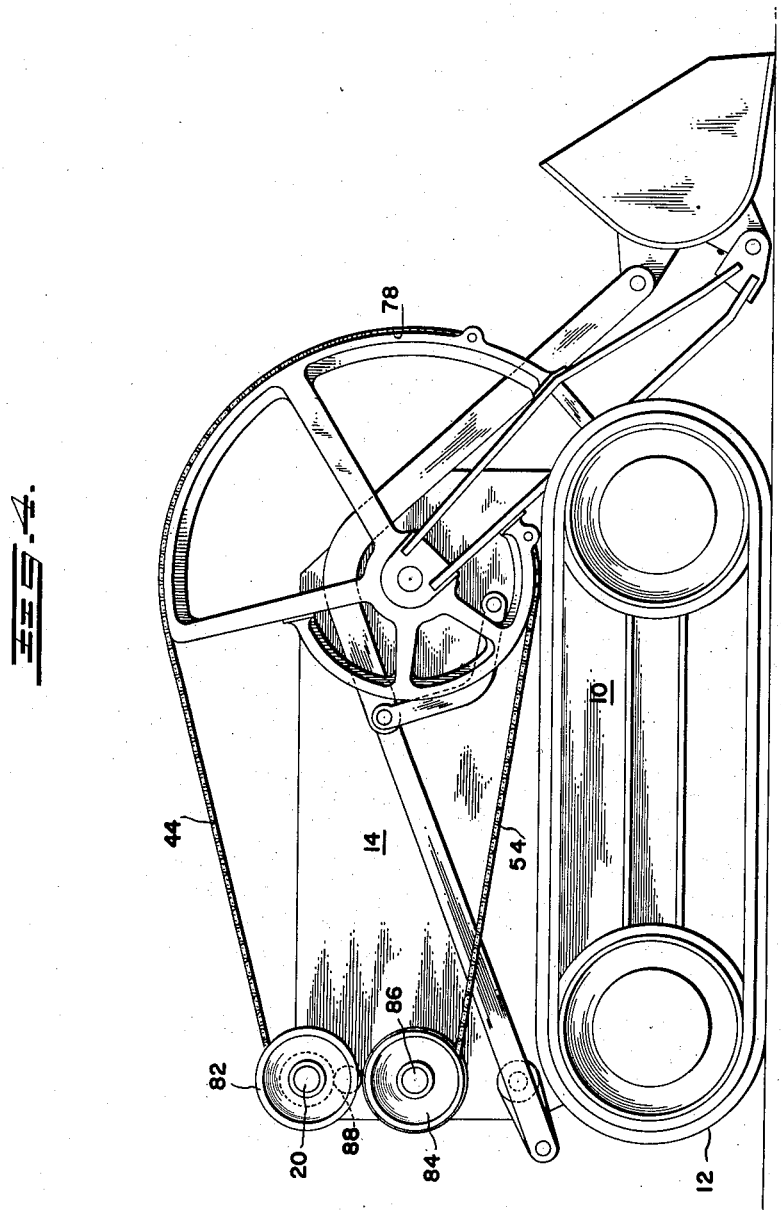
INVENTOR
DANIEL M. SCHWARTZ
BY Harold T. Stowell
ATTORNEY

United States Patent Office 2,886,192
Patented May 12, 1959

2,886,192

MATERIAL HANDLING MACHINE

Daniel M. Schwartz, Salt Lake City, Utah, assignor, by mesne assignments, to The Eimco Corporation, Salt Lake City, Utah, a corporation of Delaware Application April 9, 1956, Serial No. 576,897

9 Claims. (Cl. 214—130)

This invention relates to material handling machines and more particularly and specifically to shoveling machines or muckers of the type employing an overhead bucket for loading muck or other materials into cars or trucks.

It is a principal object of this invention to provide a rugged, self-propelled machine for the surface handling of bulk materials and which may also be employed in mines, tunnels and other places where low headroom requirements are essential.

Another object of this invention is the provision of a material handling machine for the lifting, transporting and loading of muck or other like materials in substantial quantities and in a positive and efficient manner.

Still a further object of this invention is to provide a shoveling machine including an overhead-type scoop or bucket for lifting and handling materials which includes new and improved methods and apparatus for controlling the movement and operation of the bucket.

A further object is to provide a material handling machine having a pivoted bucket which includes control apparatus for moving the bucket from a muck digging or engaging position to an elevated dumping position wherein the power means for moving the bucket operates through structure applying variable torque to the bucket elevating apparatus at varied stages or positions of bucket movement.

These and other objects and advantages of the material handling machine constituting the present invention will be apparent from the following description and the accompanying drawings in which:

Fig. 1 is a side elevation of an illustrative embodiment of the material handling machine constituting the present invention.

Fig. 2 is a side elevation of the apparatus disclosed in Fig. 1 with the material handling bucket in a raised position.

Fig. 3 is a top plan view of the machine illustrated in Fig. 1.

Fig. 4 is a side elevation of a modified form of the machine constituting the present invention.

Fig. 5 is a rear elevational view of the machine shown in Fig. 4.

Generally the material handling machine constituting the present invention consists of an automotive-type vehicle including a frame or body supported on crawler or self-laying track units, a power actuated material gathering receptacle mounted on said frame for movement relative thereto, elevating means for moving the receptacle from a depressed material gathering position to an elevated material dumping position, said elevating means including a curvilinear track associated with the receptacle supporting means, a drive cable working over the length of said curvilinear track in a direction away from the depressed position of said receptacle, a second curvilinear track associated with said receptacle supporting means, a drive cable associated with said second receptacle working along the length thereof in a direction substantially parallel to the working direction of said first cable, both of said cables having operable connection to a power take-up means, and independent means for moving said receptacle relative to its supporting means when in an elevated position.

With reference to the illustrative embodiments of the present invention, and in particular to Figs. 1, 2 and 3, there is shown a material handling machine which generally comprises a main body 10 which is mounted on crawler, or self-laying track units 12. The main body carries a superstructure thereon consisting of a pair of main side frames 14 which extend vertically above the body portion longitudinally adjacent each side thereof. A bucket pivoting shaft 16 is supported between the forward portions of the side frames 14 above the main body 10 and a power unit 18, such as an internal combustion engine or the like, is mounted on the main body portion intermediate the rearward ends of the side frames 14. Powered shafts 20 extend in opposed axial alignment outwardly from the power unit through each of the side frames 14.

A pair of elongated bucket supporting arms 22 is mounted one on each extremity of the forward pivot shaft 16 with the extended end of each arm being pivotally secured as at 24 to a bracket 26 formed on the outer face of a scoop-type digging bucket 28 with said supporting arm attachment to the bucket being located generally rearwardly from the digging edge 30 of the bucket. Associated with each of the bucket supporting arms 22 is a curvilinear work surface 32 which takes the form of a curved track 34 supported on the extremities of spoke members 36 the base ends of which are attached to a hub 38 mounted on the pivot shaft 16 immediately adjacent the attachment of the bucket supporting arm thereto. The curved track is positioned, as seen in Fig. 1, so that it extends arcuately from a point of attachment at one end thereof as at 40 to the upper face of the bucket supporting arm at a point intermediate the length of said arm in an upward direction for a spaced distance whereupon it curves rearwardly to terminate as at 42 at a point above the side frame 14. A flexible draft means such as chain 44 has one end secured as at 46 at a forward point on the curved track 34 with said chain being engaged rearwardly along the length of the curved track and extending from the point of track termination at 42 rearwardly of the machine where the second end of the chain is secured to a reel 48 mounted on the extended end of the power shaft 20.

Additionally, a second and smaller curvilinear track 50 is mounted from the hub 38 in a position generally beneath the underside of the bucket supporting arm 22 by spokes 52 extending downwardly and rearwardly from the hub. A second cable or chain 54 has one end attached as at 56 to the forward lowermost point of the second track 50 with the second end of the chain 54 extending rearwardly of the machine over the curved surface 50 where it is attached to a second reel or drum 58 mounted on the power shaft 20 immediately outwardly of the main frame from the reel 48.

In accordance with the foregoing construction, it will be seen that operation of the power means will cause rotation of the reels 48 and 58 in the same direction whereupon one of the two chains 44 or 54 will be wound on its respective reel simultaneously with the unwinding or release of the other cable or chain from its respective reel. Therefore, assuming that the bucket is positioned as shown in Fig. 1 of the drawings, operation of the power means 18 will cause rotation of both reels 48 in a counterclockwise direction causing the cable or chain 44 associated with the curved track 32 to be taken up while at the same time simultaneously releasing or unwinding chain 54 from its respective reel. As the chain or cable 44 is taken up it will act along the curved track 32 to rotate the track and its supporting hub 38 to cause rotation of the pivot shaft 16 in a counterclockwise direction thereupon causing movement of the bucket supporting arm 22 to move the bucket to an elevated position such as is shown in Fig. 2 of the drawings.

By providing a cam shaped curved track, such as is the configuration of the track 32 illustrated in Fig. 1, with the greatest radius of the cam surface relative to the axis of the pivot shaft 16 being at the rearward uppermost end of the track adjacent its termination point 42, and with said radius gradually diminishing toward the forward end thereof, it will be seen that the bucket lifting force exerted on arm 22 and on the shaft 16 through the hub of the track member will have a greater torque during the initial lifting stages of the bucket from its muck engaging position with said torque diminishing, and at the same time the lifting speed of the bucket supporting arm increasing, as the cam shaped track rotates rearwardly of the machine under the influence of the chain 44 operating in engagement along the surface thereof.

Simultaneously with the foregoing described operation, the second curvilinear track 50 will be rotated forwardly and upwardly relative to the rocker arm 16 whereupon the chain 54 will be taken up along the surface of the track, as seen in Fig. 3, as it is released from its respective reel. Because of the difference in the radii between the large track 32 and the smaller track 50, the two pair of reels have different diameters based upon the difference in the radii of the tracks to insure substantially uniform winding and unwinding of the chains. However, because of the cam-shaped configuration of the larger track as compared with the circular configuration of the smaller track the chain 54 will assume a slacked condition, as seen in Fig. 2, when the bucket leaves its lowermost digging position. Thus, except when the bucket is in a digging position and it is desired to force the bucket into the muck pile by application of power through reels 58, chains 54 and curved tracks 50, the possibility of overloading either chain by the irregular track surfaces is avoided.

In addition to the foregoing control apparatus which has been described in its utility in elevating the bucket from a digging position to an elevated position, there is provided apparatus for tilting the bucket in its elevated position to cause a dumping of the contents into a truck, wagon or the like. This bucket tilting apparatus consists of an elongated curved arm 60 which has pivotal connection at one end to a bracket 62 secured on the rearward upper portion of the muck bucket 28 above the bracket 26 to which the supporting arm is attached. The arm 60 is positioned to extend rearwardly above and substantially parallel with the bucket supporting arm 22 where it curves or turns as at 64 around the pivot shaft 16 to be secured pivotally at its second end to the forward end of an operating bar 66, the rearward end of which is pivotally secured eccentrically to a crank 68 which in turn is secured to a power shaft 70 for rotation therewith. The power shaft 70 is selectively rotated by a power means (not shown) such as a hydraulic ram, motor or the like.

A buttress bracket 72 is secured to the main body 10 of the vehicle substantially beneath the pivot shaft 16 and a curved link 74 is pivotally secured at one end to the buttress bracket with the second end thereof being pivotally secured to the pin 76 which pivotally interconnects the tilting arm 64 and the operating bar 66.

In operation of the tilting apparatus, elevation of the bucket in the manner heretofore described will cause the tilting arm 60 to rotate about the pin 76 so that when the bucket is in its elevated position that portion of the tilting arm 60 adjacent the pin 76 will have turned through about 90° to assume the position illustrated in full line in Fig. 2 of the drawings. During the elevation of the bucket to its dumping position there will be no movement or change of position of the operating bar 66 or the curved link 74 from the positions maintained by these members when the bucket is in a digging position.

In order to tilt the bucket to a dumping position, such as is indicated in dotted line in Fig. 2 of the drawings, power shaft 70 is rotated through 180° whereupon the crank 68 is simultaneously rotated to cause a forward movement of the operating bar 66 which brings about a forward and upward movement of tilting arm 60, as is illustrated in dotted line in Fig. 2, which causes rotation of the bucket about the fixed pivot 22 at the point of bucket attachment to the supporting arm 22 thereby dumping the contents of the bucket forwardly and outwardly therefrom relative to the vehicle.

From the foregoing description it is seen that a material handling machine has been provided which includes a pivotally supported muck digging bucket which is movable from a low forwardly extending muck digging position to an elevated dumping position wherein the opposed forces of oppositely acting chains or cables powered from a common source are utilized to maintain the bucket in a fixed muck digging position, which chains operate alternately to assist in the raising and lowering of the bucket from its muck digging to its dumping position. It is additionally evident that structures have been described which will provide for the application of variable torque in the powered elevation of the muck bucket from its digging position in such a manner that a maximum torque will be applied during the initial portion of the elevating operation with said torque decreasing simultaneously with an increase in elevation speed as the bucket is raised above its muck engaging position.

In Figs. 4 and 5 of the drawings there is illustrated a modified construction of the material handling machine constituting the present invention wherein the cam-shaped track 32 heretofore described is replaced by a curvilinear track 78 which is of a true arcuate configuration. Additionally, there is a modification of the drive arrangement for the respective cables or chains 44 and 54 wherein the chain 44 is connected to a reel 82 mounted on the power shaft 20 of the power means 18 while a reel 84, receiving the rearward end of the cable 54 is mounted on a stub shaft 86 supported between the power means housing and the side frame 14 directly beneath the power shaft 20. In this form an idler gear 88 is supported free from the power means housing in cooperative engagement between gear wheels 90 and 92 mounted on power shaft 20 and stub shaft 86 respectively. The ratio of gears 90 and 92 is determined by the difference in the radii of the two tracks.

In the foregoing construction the two reels 82 and 84 will still turn in the same direction and the cables 44 and 54 will be wound on the top and bottom of the two reels, respectively thereby lowering the forwardly extending cable 54 below its position illustrated in the original embodiment thus producing a greater clearance for rotation of the larger arcuate track 78 in its downward and rearward direction upon elevation of the muck bucket.

It is additionally shown in Fig. 4 of the drawings that the bucket supporting arm 22 may be modified into an open truss construction of any suitable type having sufficient strength and rigidity to raise the bucket to its elevated position.

It is to be additionally noted that it is contemplated that a combination of the structures disclosed in the two forms hereinbefore described is fully possible wherein a cam-shaped track, as illustrated in Fig. 1 of the drawings, can be utilized with the double reel construction illustrated in Fig. 4 without departing from the scope and spirit of the invention and with the achievement of the same new and improved results as are obtained by either of the two forms of the invention individually.

The machine of the present invention has been described in association with motor-driven reels for pulling the flexible draft means to actuate the material handling device arm. However, it will be apparent that the reels may be replaced by cam surfaced members, fluid pressure actuated cylinders, rack and pinions and the like as described in U.S. patent application, Serial Number 241,057 filed August 9, 1951, now United States Patent 2,746,625.

Thus, from the foregoing descriptions and disclosures it is manifest that an improved material handling machine has been provided which serves to accomplish the objects and advantages, and the new and improved results heretofore set forth.

Having thus described and explained the present invention in its several illustrative embodiments and the possible modifications and sub-combinations obtainable, what is desired to be claimed is:

1. A material handling machine comprising a main frame, a shaft pivotally mounted on said frame, an arm secured at one end to said shaft and carrying a material handling device at the other end, a pair of members having oppositely directed curvilinear discontinuous outer surfaces secured to said shaft, the curvilinear surfaces of each of the pair of members being of different radii, a pair of reels rotatably mounted on said frame remote from said shaft, first flexible draft means trained over one of the curvilinear surfaces of one of said members and having one end secured to the forwardmost end of said surface, the second end of the first flexible draft means secured to one of the reels for rotating said arm in one direction, second flexible draft means trained about the other curvilinear surface of the other of said members and having one end secured to the forwardmost end of said surface, the second end of the second flexible draft means secured to the other of the reels for rotating said arm in the opposite direction.

2. A material handling machine comprising a main frame, a shaft pivotally mounted on said frame, an arm secured at one end to said shaft and carrying a material handling device at the other end, said arm having pivotal connection to said material handling device, a second elongated arm having pivotal connection at one end to said device at a point thereon above the connection of said first arm, the second end of said arm pivotally secured to an eccentric point on a rotating crank mounted on the forward end of said frame, selectively operable power means for rotating said crank, a pair of members having oppositely directed curvilinear outer surfaces secured to the shaft with one of the curved surfaces facing generally upwardly and the other of the curved surfaces facing generally downwardly, a first reel, flexible draft means entrained over said one curved surface and having one end secured to the forward end thereof and the other end of the flexible draft means secured to said first reel, a second reel, flexible draft means entrained about the other of said curved surfaces and having one end secured to the forward end thereof and the other end of the flexible draft means secured to said second reel, and power means for rotating said reels.

3. The invention defined in claim 2 wherein the curved surface facing generally upwardly has a varying radius from a high torque low speed zone when the material handling device is in the depressed position to a high speed low torque zone in the raised position.

4. The invention defined in claim 3 wherein the curved surface positioned generally downwardly is a circular arc.

5. The invention defined in claim 1 wherein the first and second reels rotate in the same direction with the flexible draft means adapted to feed from the top of one reel and the bottom of the other reel.

6. A material handling machine comprising a main frame, a shaft pivotally mounted on said frame, an arm secured at one end to said shaft and carrying a material handling device at the other end, a pair of members having oppositely directed curvilinear discontinuous outer surfaces secured to said shaft, the curvilinear surfaces of each of the pair of members being of different radii, separate pulling means for rotating said arm in opposite directions mounted on said frame remote from said shaft, first flexible draft means trained over one of the curvilinear surfaces of one of said members and having one end secured to the forwardmost end of said surface, the second end of the first flexible draft means secured to one of the pulling means for rotating said arm in one direction, second flexible draft means trained about the other curvilinear surface at the other of said members and having one end secured to the forwardmost end of said surface, the second end of the second flexible draft means secured to the other of said pulling means for rotating said arm in the opposite direction.

7. A material handling machine as defined in claim 6 wherein the pair of members having oppositely directed curvilinear outer surfaces are transversely offset and wherein the first and second flexible draft means are of different lengths.

8. The invention defined in claim 6 wherein one of said pair of members adapted to raise the material handling device from a depressed material gathering position has a varying radius from a high torque low speed zone when the material handling device is in the depressed position to a high speed low torque zone in the raised position.

9. A material handling machine comprising a main frame, an arm, means pivotally mounting one end of said arm to the main frame, a material handling device carried at the other end of said arm, a first member mounted to pivot with said arm and to actuate the material handling device from a low forward loading position to an elevated transport position, a second member mounted to pivot with said arm and to actuate the material handling device from the elevated transport position to the low forward loading position, said first and second members having oppositely directed curvilinear discontinuous outer surfaces of different radii mounted to pivot said arm, first flexible draft means, means attaching one end of said first flexible draft means to said first member, first pulling means mounted on said material handling machine, said first flexible draft means being trained over the curvilinear surface of said first member when the material handling device is in the low forward loading position and means attaching the other end of the first flexible draft means to said first pulling means for rotating said arm from the low forward loading position to the elevated transport position, second flexible draft means, means attaching one end of said second flexible draft means to said second member, second pulling means mounted on the material handling machine, said second flexible draft means being trained over the curvilinear surface of said second member when the material handling device is in the elevated position, and means attaching the other end of said second flexible draft means to said second pulling means for rotating said arm from the elevated transport position to the low forward loading position.

References Cited in the file of this patent

UNITED STATES PATENTS

| | | |
|---|---|---|
| 711,806 | White | Oct. 21, 1902 |
| 852,919 | Whittemore | May 7, 1907 |
| 1,828,919 | Baker | May 7, 1931 |
| 2,712,876 | Kuehn | July 12, 1955 |
| 2,746,625 | Schwartz et al. | May 22, 1956 |